(12) United States Patent
Higashikado et al.

(10) Patent No.: US 11,641,271 B2
(45) Date of Patent: May 2, 2023

(54) CONTROL METHOD, NON-TRANSITORY COMPUTER-READABLE STORAGE MEDIUM, AND INFORMATION PROCESSING APPARATUS

(71) Applicant: FUJITSU LIMITED, Kawasaki (JP)

(72) Inventors: Yoshiki Higashikado, Yokohama (JP); Shingo Fujimoto, Yokohama (JP); Masanobu Morinaga, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 191 days.

(21) Appl. No.: 17/159,395

(22) Filed: Jan. 27, 2021

(65) Prior Publication Data

US 2021/0273785 A1    Sep. 2, 2021

(30) Foreign Application Priority Data

Feb. 28, 2020   (JP) .............................. JP2020-033275

(51) Int. Cl.
*H04L 29/06* (2006.01)
*H04L 9/08* (2006.01)
*H04L 9/06* (2006.01)
*H04L 9/14* (2006.01)

(52) U.S. Cl.
CPC .......... *H04L 9/0819* (2013.01); *H04L 9/0637* (2013.01); *H04L 9/0894* (2013.01); *H04L 9/14* (2013.01)

(58) Field of Classification Search
None
See application file for complete search history.

(56) References Cited

U.S. PATENT DOCUMENTS

2016/0275461 A1    9/2016   Sprague et al.

FOREIGN PATENT DOCUMENTS

| CN | 110603543 A | * | 12/2019 | .......... G06K 7/1099 |
| JP | 2016-153951 A | | 8/2016 | |
| JP | 2018-516026 A | | 6/2018 | |
| WO | 2019/168792 A1 | | 9/2019 | |
| WO | WO-2019168792 A1 | * | 9/2019 | ............. G06F 21/32 |

OTHER PUBLICATIONS

Vincenzo, Di Nicola, "Custody at Conic—part 3.", Jan. 3, 2020 (Jan. 3, 2020), XP055809363, Retrieved from the Internet: URL: https://medium.com/conio/custody-at-conio-part-3-623292bc9222 pp. 8-10 (Year: 2020).*

(Continued)

*Primary Examiner* — Andrew J Steinle
(74) *Attorney, Agent, or Firm* — WHDA, LLP

(57) ABSTRACT

A control method includes generating third key information, when receiving a recording request for asset information to a blockchain and first key information, based on the first key information and second key information stored in a specific storage area, generating fourth key information by decrypting key information associated with the blockchain among a plurality of pieces of encrypted key information, by using the generated third key information, transmitting the fourth key information and the recording request to the blockchain.

14 Claims, 15 Drawing Sheets

(56) References Cited

OTHER PUBLICATIONS

Vincenzo, Di Nicola, "Custody at Conic—part 3.", Jan. 3, 2020 (Jan. 3, 2020), XP055809363, Retrieved from the Internet: URL:https://medium.com/conio/custody-at-conio-part-3-623292bc9222 [retrieved on May 31, 2021], pp. 8-10; Cited in Extended European Search Report dated Jun. 14, 2021. (16 pages).
Fujimoto, Shingo et al., "ConnectionChain: the Secure Interworking of Blockchains", 2019 Sixth International Conference on Internet of Things: Systems, Management and Security (IOTSMS), IEEE, Oct. 22, 2019 (Oct. 22, 2019), pp. 514-518, XP033676710, [retrieved on Dec. 20, 2019], sections III-V; Cited in Extended European Search Report dated Jun. 14, 2021. (5 pages).
Extended European Search Report dated Jun. 14, 2021, from corresponding to EP Application No. 21152274.3. (7 pages).
Doi, "About Secret Sharing Method and Its Application", Information Security Comprehensive Science, Nov. 2012, vol. 4, pp. 137-149, URL:https://www.iisec.ac.jp/proc/vol0004/doi.pdf, cited in Specification, w/English translatior (32 pages).
"Intel SGX-Remote Attestation Overview", URL:https://qiita.com/Cliffford/items/095b1df450583b4803f2, Jan. 8, 2020, cited in Specification, w/English translation (23 pages).
"Blockchain New Technology for Safely Supporting Transaction Between Virtual Currencies", URL:https://blog.global.fujitsu.com/jp/2018-01-24/01/, cited in Specification, w/English translation (7 pages).

\* cited by examiner

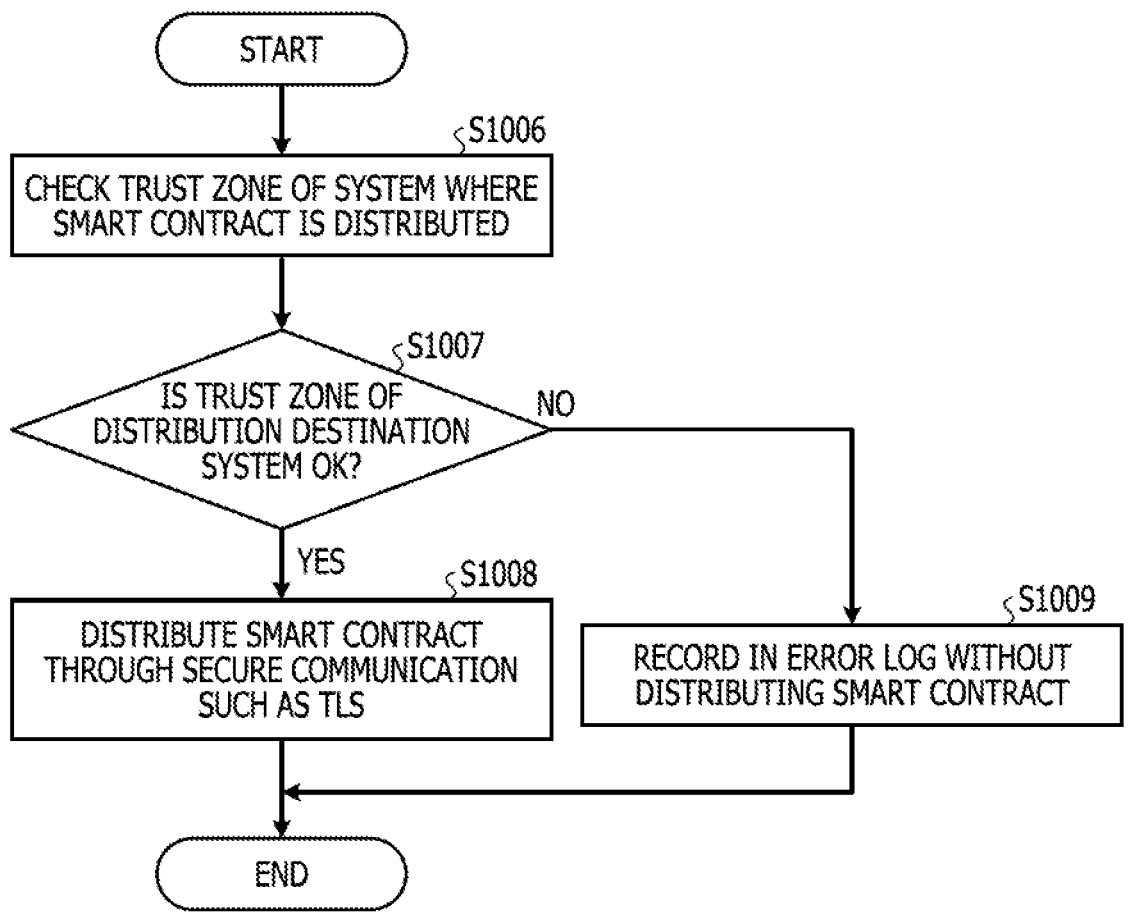

FIG. 8A

| Key | Value |
|---|---|
| USER ID + BLOCKCHAIN ID | SECRET KEY OF BLOCKCHAIN ENCRYPTED WITH COMMON KEY |

| Key | Value |
|---|---|
| USER ID | DIVIDED KEY |

K2

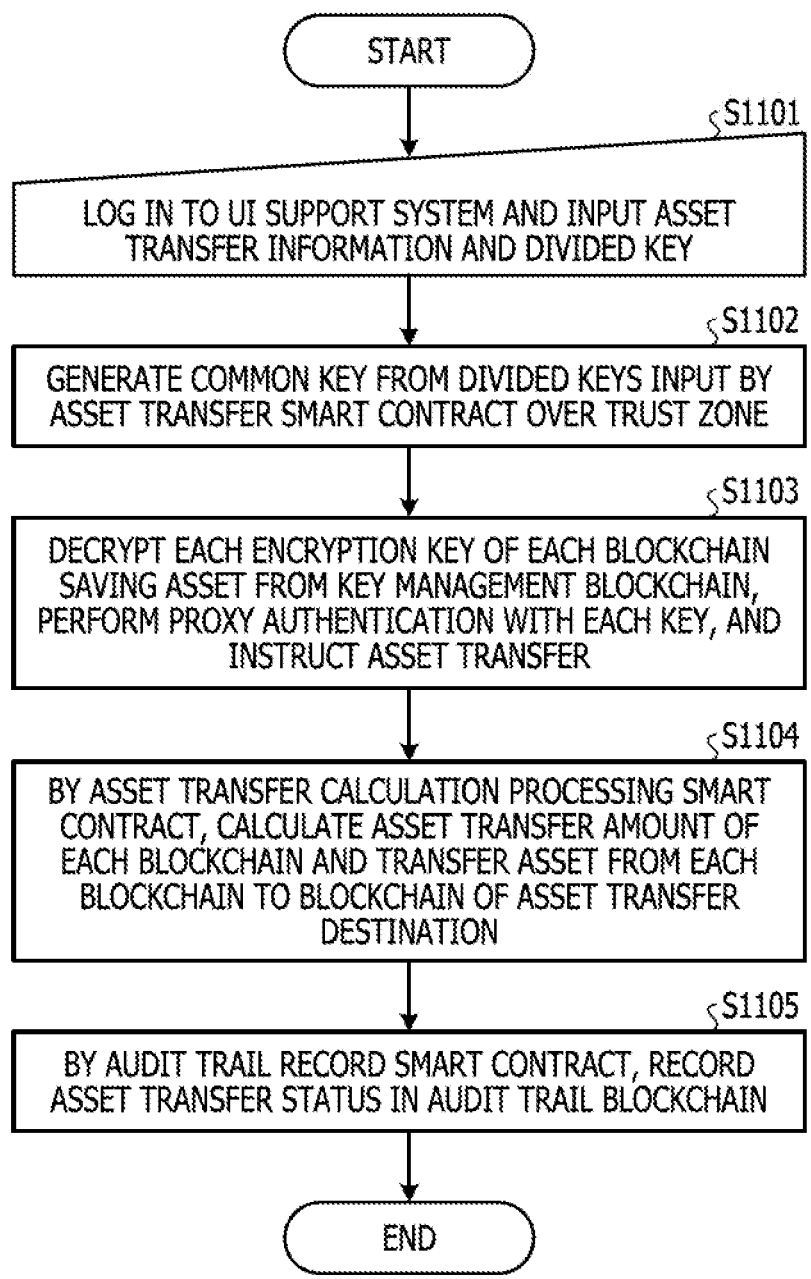

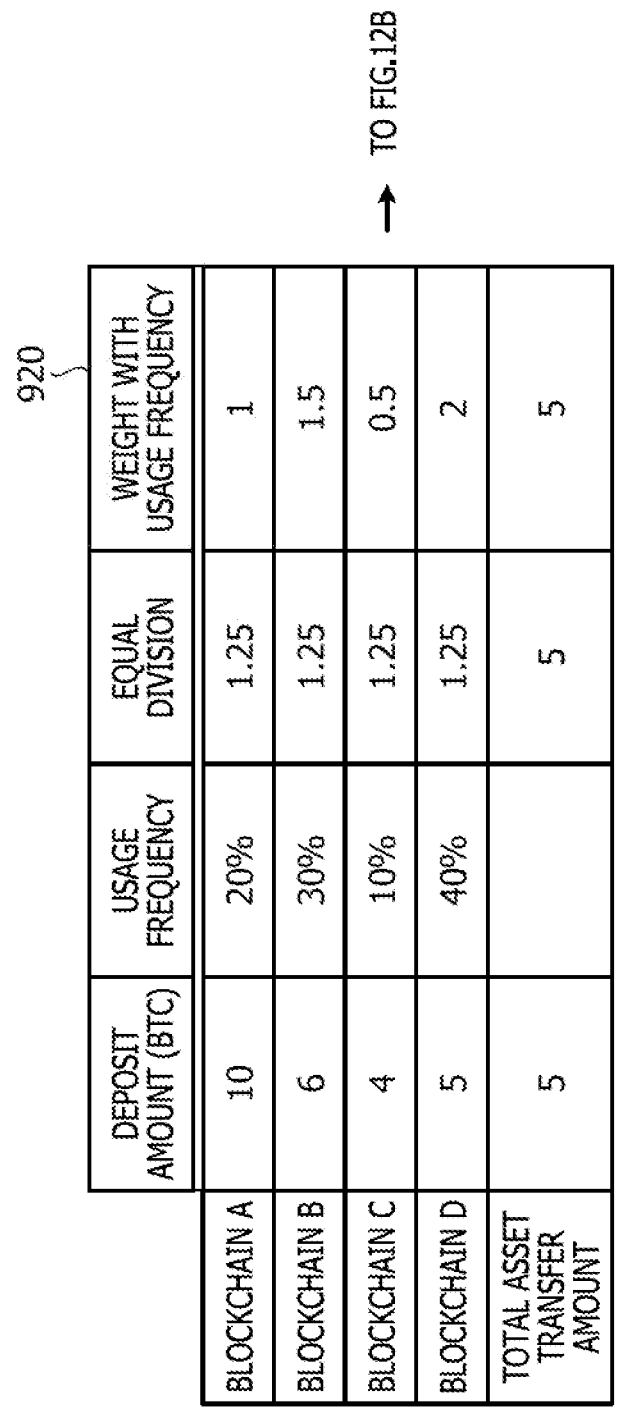

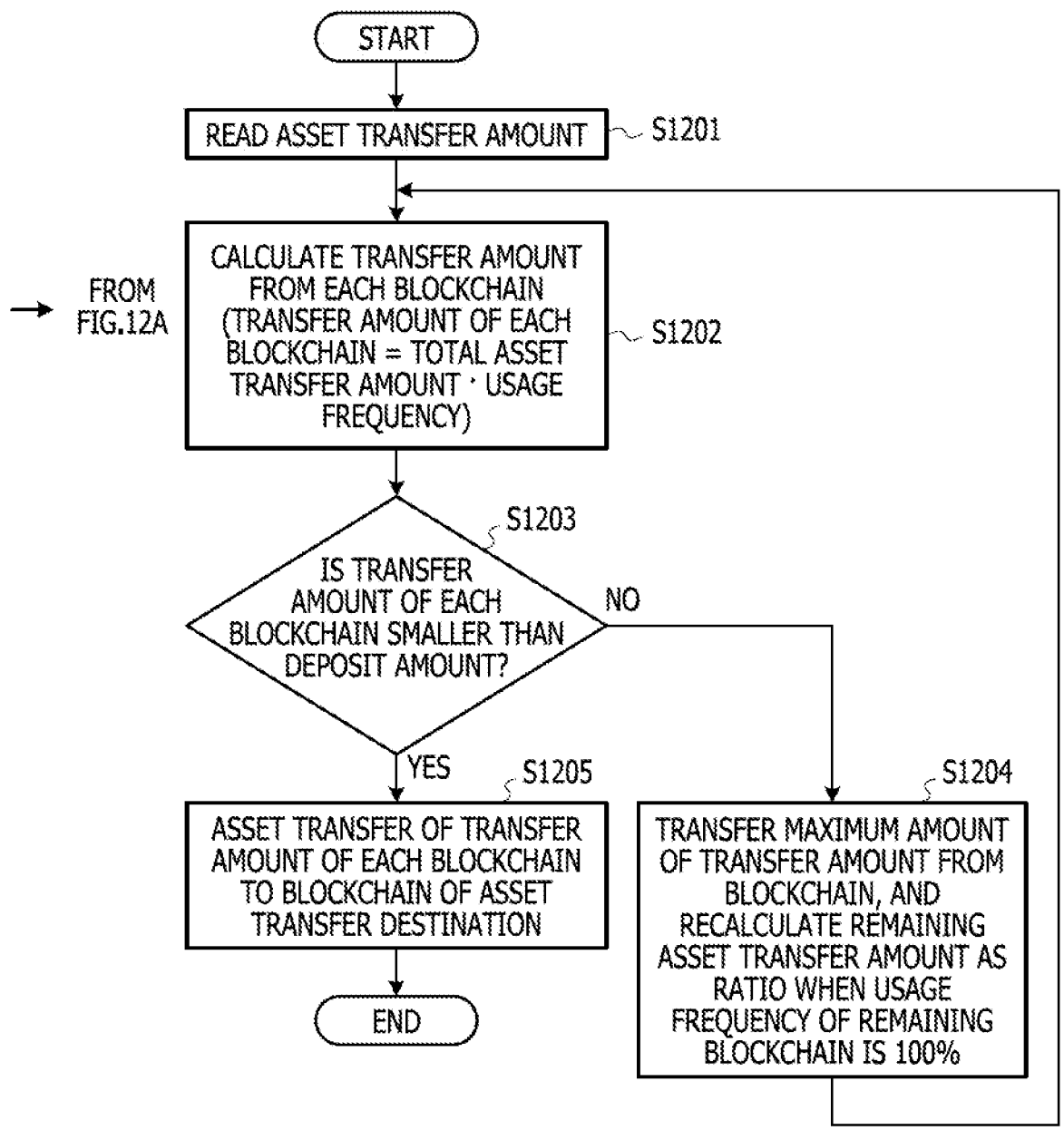

CONTROL METHOD, NON-TRANSITORY COMPUTER-READABLE STORAGE MEDIUM, AND INFORMATION PROCESSING APPARATUS

CROSS-REFERENCE TO RELATED APPLICATION

This application is based upon and claims the benefit of priority of the prior Japanese Patent Application No. 2020-33275, filed on Feb. 28, 2020, the entire contents of which are incorporated herein by reference.

FIELD

The embodiment discussed herein is related to a control method, a non-transitory computer-readable storage medium, and an information processing apparatus.

BACKGROUND

In the related art, in an asset exchange place such as a cryptocurrency using a blockchain, in order to reduce a risk of theft due to a cyber attack or the like, assets are deposited in a distributed manner in a plurality of blockchains.

Related techniques are disclosed in for example Japanese Laid-open Patent Publication Nos. 2016-153951 and 2018-516026.

SUMMARY

According to an aspect of the embodiments, a control method includes generating third key information, when receiving a recording request for asset information to a blockchain and first key information, based on the first key information and second key information stored in a specific storage area, generating fourth key information by decrypting key information associated with the blockchain among a plurality of pieces of encrypted key information, by using the generated third key information, transmitting the fourth key information and the recording request to the blockchain.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7B is a flowchart illustrating an operation example at the time of environment setting;

FIG. 8A is an explanatory diagram exemplifying a data format of a key management blockchain;

FIG. 8B is an explanatory diagram exemplifying a data format of a divided key;

FIG. 11 is a flowchart illustrating an operation example during operation;

FIG. 12A is a an explanatory diagram exemplifying usage frequency information; and FIG. 12B is a flowchart illustrating an example of asset transfer processing.

DESCRIPTION OF EMBODIMENTS

Figure 1:
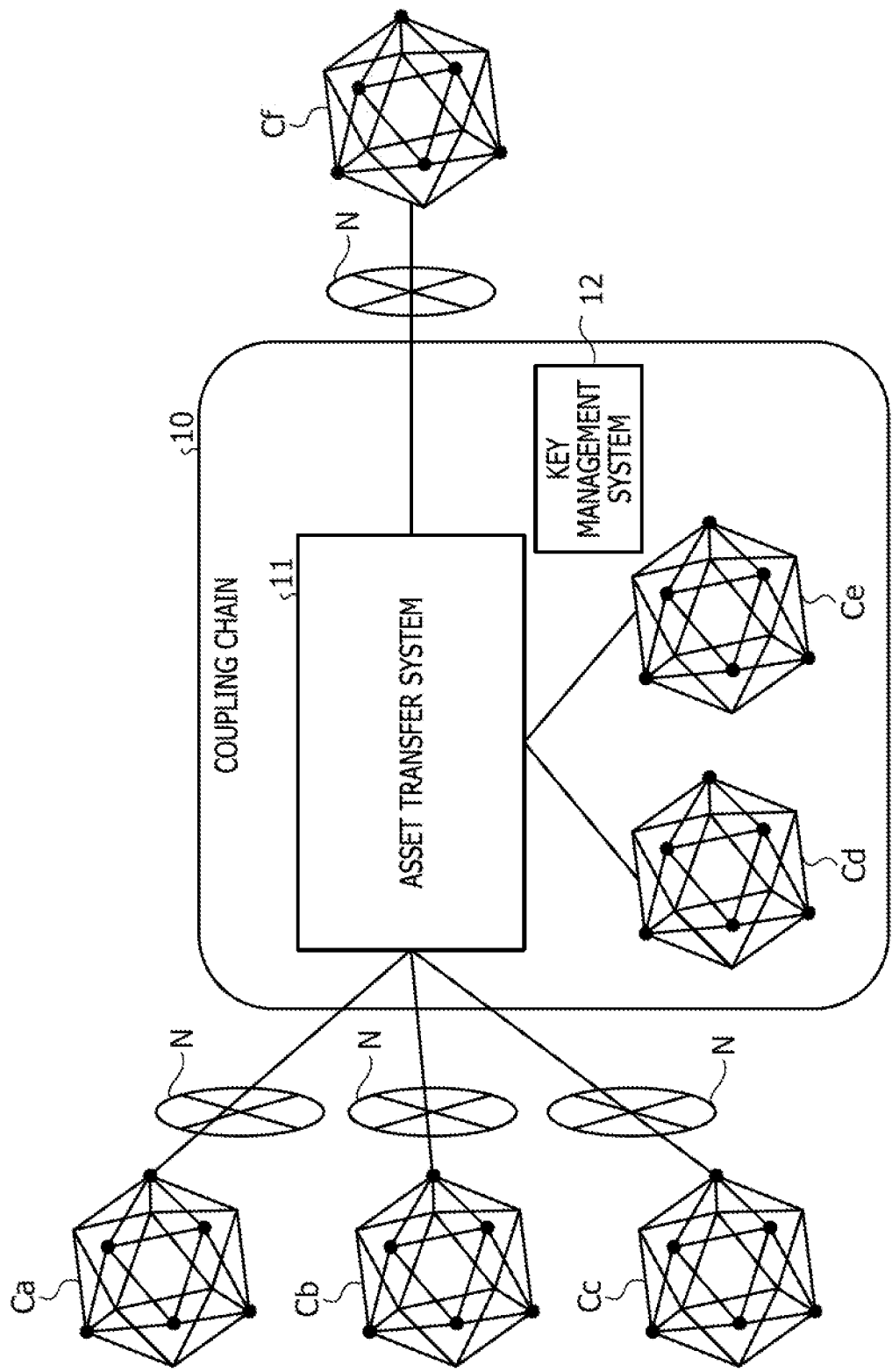
FIG. 1 is an explanatory diagram illustrating a system configuration example of a coupling chain according to an embodiment.

In the related art, since the user performs a procedure for transferring an asset from a blockchain by a terminal operation or the like for each blockchain, there is a problem that it is troublesome to perform the procedure for transferring an asset with respect to a plurality of blockchains.

For example, in order to send cryptocurrency to an account of one blockchain from a plurality of blockchains, since remittances are made from the respective blockchains to one destination blockchain after authenticating each blockchain account, authentication procedures for the number of blockchains are desired.

An object of one aspect of the embodiment is to provide a control method, a control program, and an information processing apparatus capable of supporting asset transfer between a plurality of blockchains.

Hereinafter, a control method, a control program, and an information processing apparatus according to an embodiment are described with reference to the drawings. In embodiments, the same reference numerals are used for a configuration having the same functions, and repetitive description is omitted. Note that, the control method, the control program, and the information processing apparatus described in the embodiments described below are merely illustrative and not intended to limit the embodiment. Further, the following embodiments may be combined as appropriate to the extent not inconsistent therewith.

FIG. 1 is an explanatory diagram illustrating a system configuration example of a coupling chain according to an embodiment. As illustrated in FIG. 1, a coupling chain 10 has a system configuration in which the coupling chain 10 is coupled to a plurality of asset blockchains Ca, Cb, Cc, and Cf via a communication line N such as the Internet. In this coupling chain 10, as in "New Blockchain Technology that Safely Supports Transactions between Virtual Currencies", (URL: blog.global.fujitsu.com/), a transaction of assets distributed into a plurality of asset blockchains Ca, Cb, Cc, and Cf is performed by linking a plurality of asset blockchains Ca, Cb, Cc, and Cf.

In the present embodiment, as an example, the asset blockchains Ca, Cb, and Cc are blockchains of an asset transfer source. Further, it is assumed that the asset blockchain Cf is a blockchain of an asset transfer destination. Further, it is assumed that a user of the coupling chain 10 related to the asset transfer is a user U1 (refer to FIGS. 4 and 9).

The coupling chain 10 includes an asset transfer system 11, a key management system 12, an audit trail blockchain Cd, and a key storage blockchain Ce. The asset transfer system 11 is a computer that executes a program (application) related to a smart contract that automates office procedures or contract processing in a plurality of asset blockchains Ca, Cb, Cc, and Cf. The key management system 12 is a computer that executes a program (application) related to a smart contract that automates processing related to the procedures and operations of key information (divided key, and the like) related to a plurality of asset blockchains Ca, Cb, Cc, and Cf. The audit trail blockchain Cd is a blockchain for the audit trail. The key storage blockchain Ce is a blockchain for managing key information.

Figure 2:
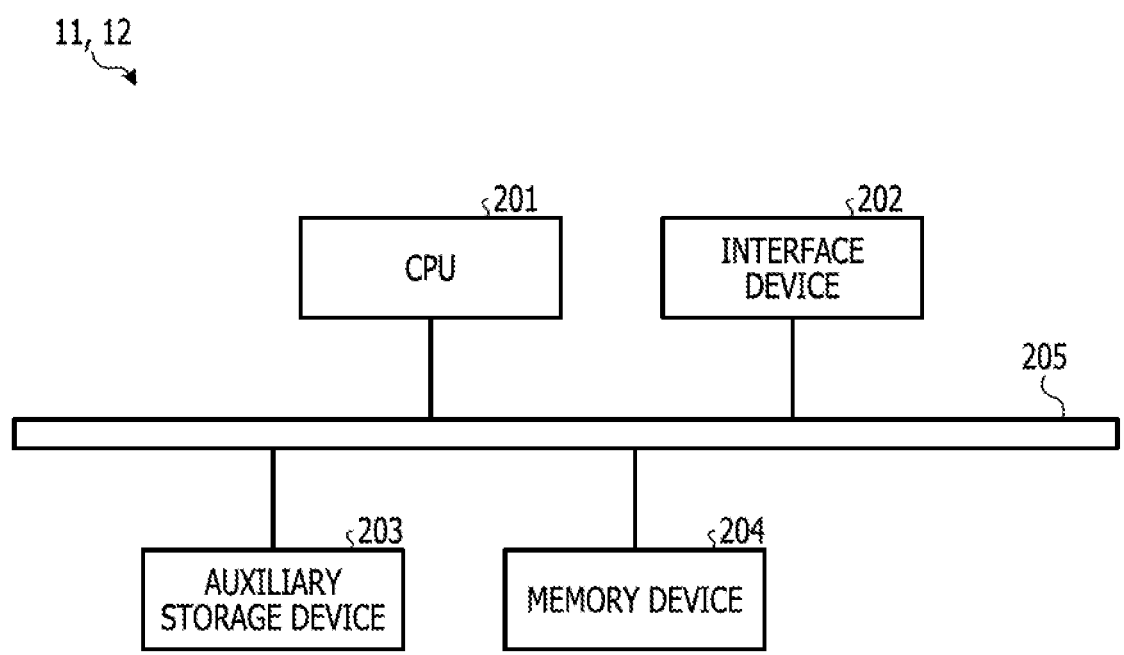
FIG. 2 is a block diagram illustrating an example of a computer configuration.

FIG. 2 is a block diagram illustrating an example of a computer configuration. As illustrated in FIG. 2, systems (for example, the asset transfer system 11, the key management system 12, and each node) configuring the coupling chain 10 and the asset blockchains Ca, Cb, Cc, and Cf have a configuration of a normal computer such as a personal computer (PC).

Specifically, the computers of the asset transfer system 11 and the key management system 12 include a CPU 201, an interface device 202 communicating with an outside, an auxiliary storage device 203 storing a program or the like, and a memory device 204 providing a work area for the interface device 202. These units are coupled to each other via a bus 205. The CPU 201 reads a program stored in the auxiliary storage device 203, loads the program into a work area of the memory device 204, and executes the program, thereby performing various processing related to a smart contract or the like.

Note that, the CPU 201 is a CPU having the functions of INTEL (registered trademark) software guard extensions (SGX) in "INTEL SOFTWARE GUARD EXTENSIONS", (URL: software.intel.com/). That is, various processing related to a smart contract or the like executed by the CPU 201, key information generated in the processing, and the like are stored and protected over a storage area (trust zone) protected by data encryption.

Figure 3:
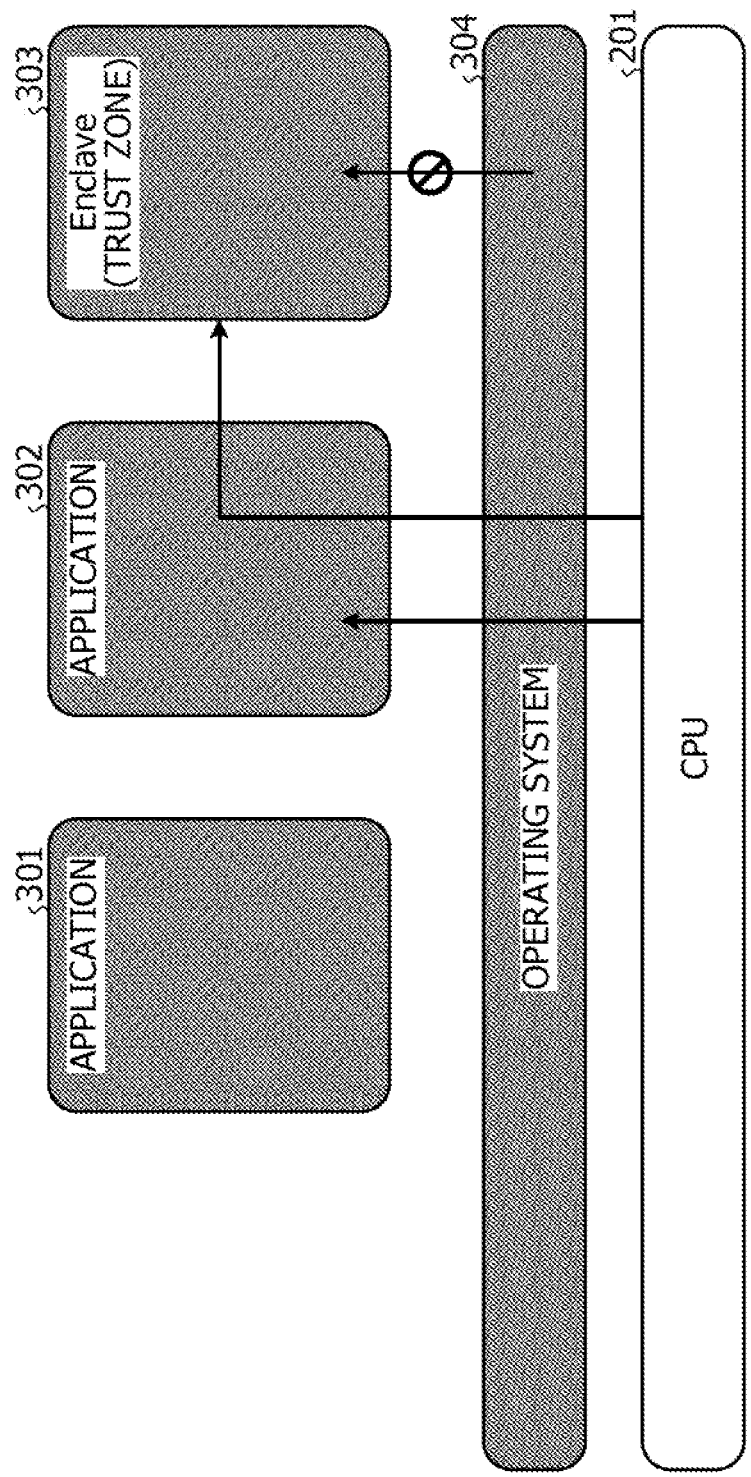
FIG. 3 is an explanatory diagram for explaining an overview of a trust zone.

FIG. 3 is an explanatory diagram for explaining an overview of a trust zone. As illustrated in FIG. 3, the CPU 201 uses the function of INTEL SGX to generate a trust zone 303, protected by encryption called Enclave. Thus, data may be referenced from the process (for example, an application 302 related to a smart contract, and the like) related to the trust zone 303, and data is not able to be referenced from other processes (for example, an application 301 or an operating system 304).

First, in the coupling chain 10, as an initial environment setting, setting of key information (divided key, and the like) related to a plurality of asset blockchains Ca, Cb, Cc, and Cf is performed in the key management system 12. Here, the environment setting will be described with reference to FIGS. 4 to 8B.

Figure 4:
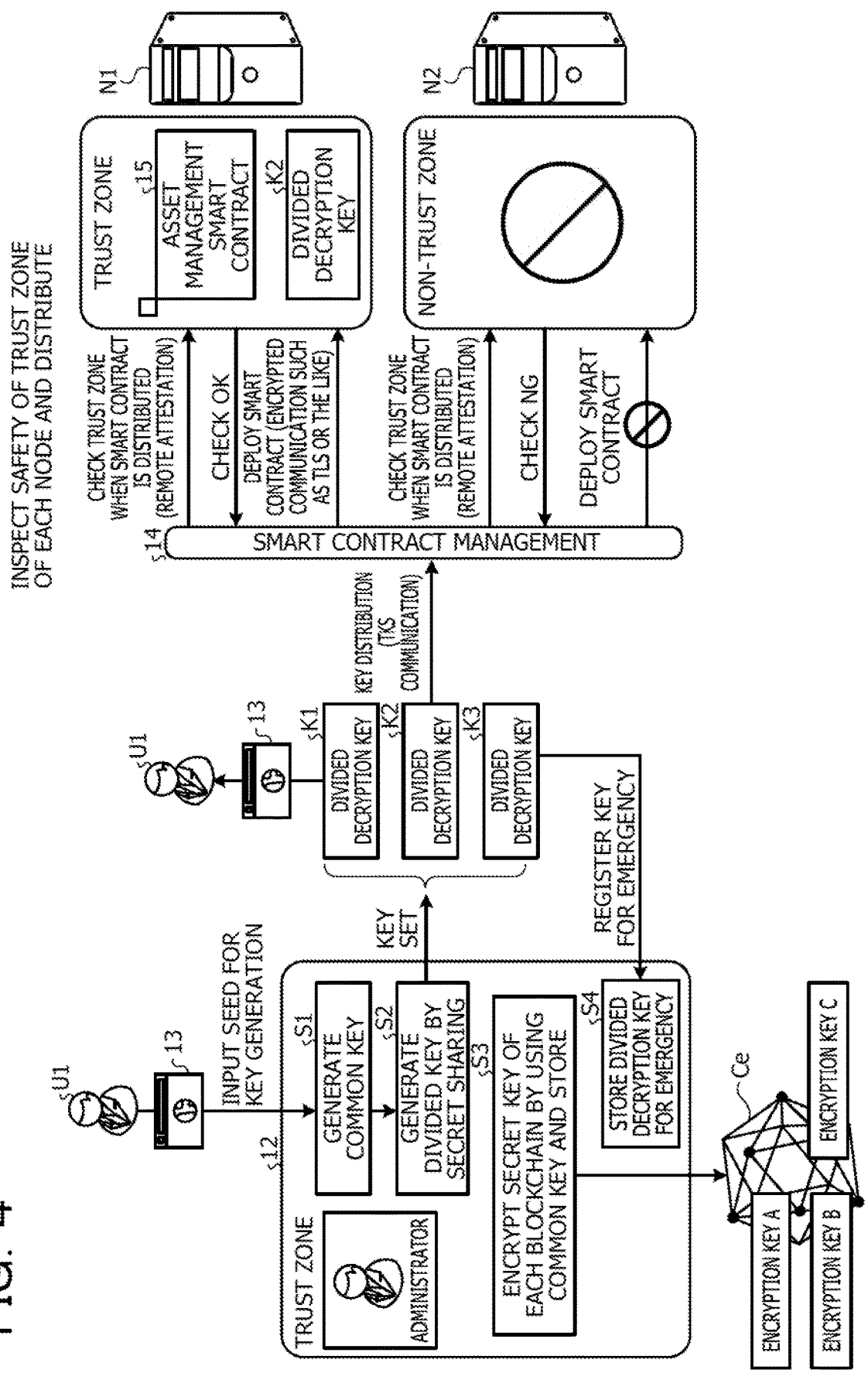
FIG. 4 is an explanatory diagram for explaining an overview at the time of environment setting.

FIG. 4 is an explanatory diagram for explaining an overview at the time of environment setting. As illustrated in FIG. 4, in the key management system 12, an input of a SEED for key generation is received from the user U1 via a terminal 13 such as a PC, and a common key is generated based on the received SEED (S1).

Next, the key management system 12 uses Shamir's secret sharing method in "Secret Sharing Method and Its Application", "Hiroshi DOI" (URL: www.iisec.ac.jp) to generate 2 of 3 divided decryption keys K1, K2, and K3 that may be decrypted when two of the three are aligned, by the generated common key (S2).

Further, the key management system 12 uses the generated common key to encrypt a secret key of the user U1 of each asset blockchain Ca, Cb, . . . , and registers (stores) the encrypted secret key in the key storage blockchain Ce (S3).

For the generated divided decryption keys K1, K2, and K3, the divided decryption key K3 is stored in the key management system 12 for emergency (S4). The divided decryption key K1 is transmitted to the terminal 13 by using the encrypted communication such as transport layer security (TLS) and is notified to the user U1. The divided decryption key K2 is distributed to each node (node N1, N2, . . . ) via the smart contract management 14.

The smart contract management 14 inspects safety of the trust zone 303 in each node (node N1, N2, . . . ), and then distributes the divided decryption key K2. Specifically, the smart contract management 14 uses a Remote Attestation function ("Intel SGX-Remote Attestation Overview", URL: qiita.com), and checks the trust zone 303 of each node (node N1, N2, . . . ) when distributing the asset management smart contract 15 related to the divided decryption key K2.

Next, in a case where it is able to confirm that the trust zone 303 of the node is safe (check OK), the smart contract management 14 distributes the asset management smart contract 15 and the divided decryption key K2 to the node N1 configuring the blockchain through the encrypted communication, and deploys them. Note that, in a case where it is not able to confirm that the trust zone 303 of the node is safe (check NG), the smart contract management 14 does not distribute the asset management smart contract 15 and the divided decryption key K2 to the node N2 configuring the blockchain.

Figure 5:
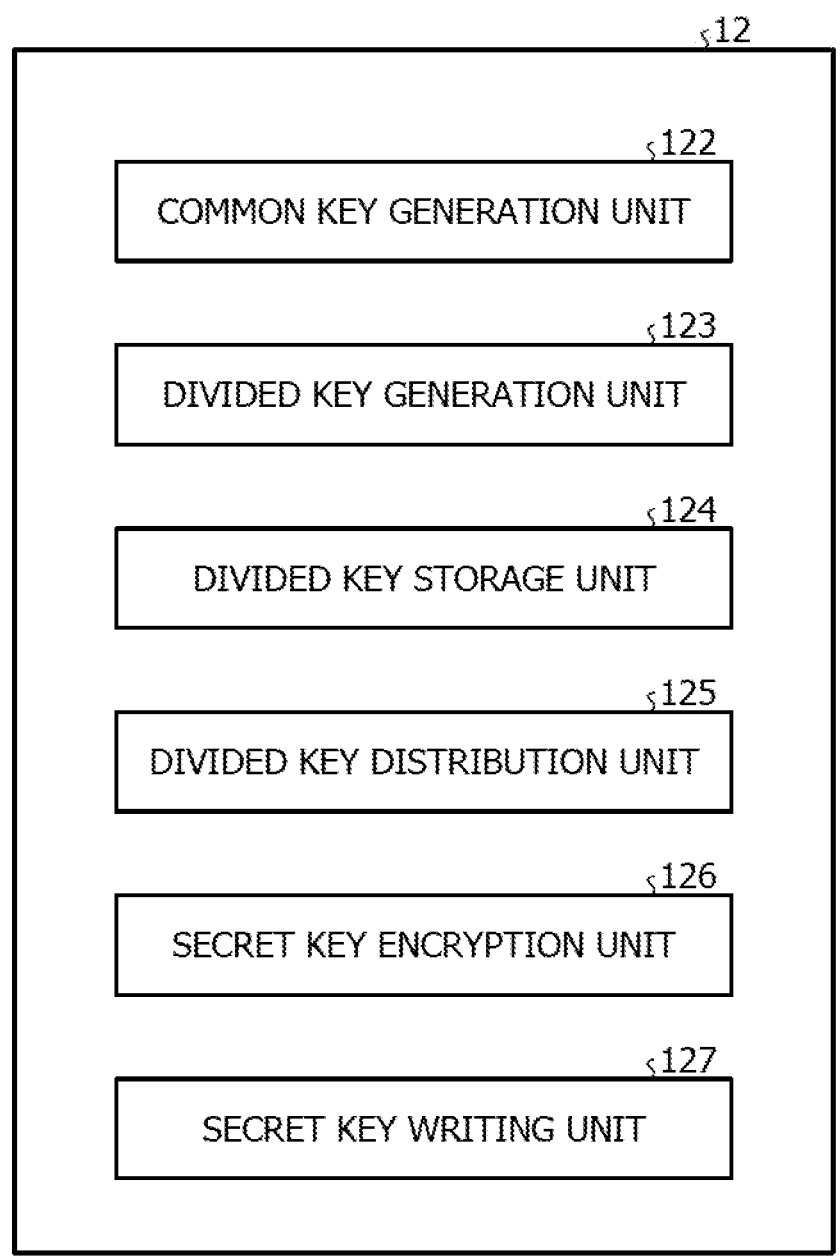
FIG. 5 is a block diagram illustrating a functional configuration example of a key management system.

FIG. 5 is a block diagram illustrating a functional configuration example of a key management system 12. As illustrated in FIG. 5, the key management system 12 includes a common key generation unit 122, a divided key generation unit 123, a divided key storage unit 124, a divided key distribution unit 125, a secret key encryption unit 126, and a secret key writing unit 127.

The common key generation unit 122 is a processing unit that generates a common key. The divided key generation unit 123 is a processing unit that generates the divided decryption keys K1, K2, and K3 by using the common key generated by the common key generation unit 122. The divided key storage unit 124 stores a divided key such as the divided decryption key K3. The divided key distribution unit 125 is a processing unit that distributes the divided decryption keys K1, K2, and K3 generated by the divided key generation unit 123. The secret key encryption unit 126 is a processing unit that encrypts the secret key of the user U1 of each asset blockchain Ca, Cb, by using the common key generated by the common key generation unit 122. The secret key writing unit 127 is a processing unit that writes the key information encrypted by the secret key encryption unit 126 to the key storage blockchain Ce.

Figure 6:
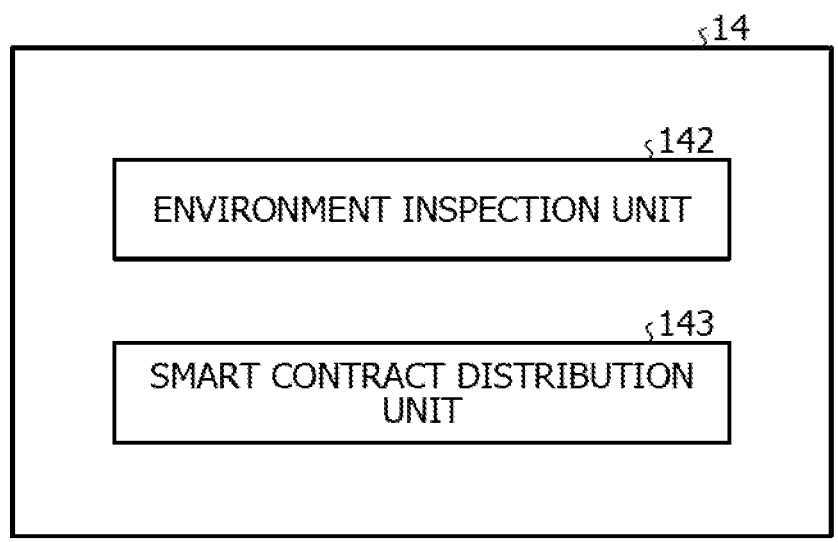
FIG. 6 is a block diagram illustrating a functional configuration example of smart contract management.

FIG. 6 is a block diagram illustrating a functional configuration example of the smart contract management 14. As illustrated in FIG. 6, the smart contract management 14 includes an environment inspection unit 142 and a smart contract distribution unit 143.

The environment inspection unit 142 is a processing unit that performs an environment check for deploying the asset management smart contract 15 and the divided decryption key K2 to each node (node N1, N2, . . . ) by using the Remote Attestation function. The smart contract distribution unit 143 is a processing unit that distributes the asset management smart contract 15 and the divided decryption key K2 through the encrypted communication in a case where it is confirmed that the trust zone 303 of the node is safe based on the environment check by the environment inspection unit 142.

Figure 7A:
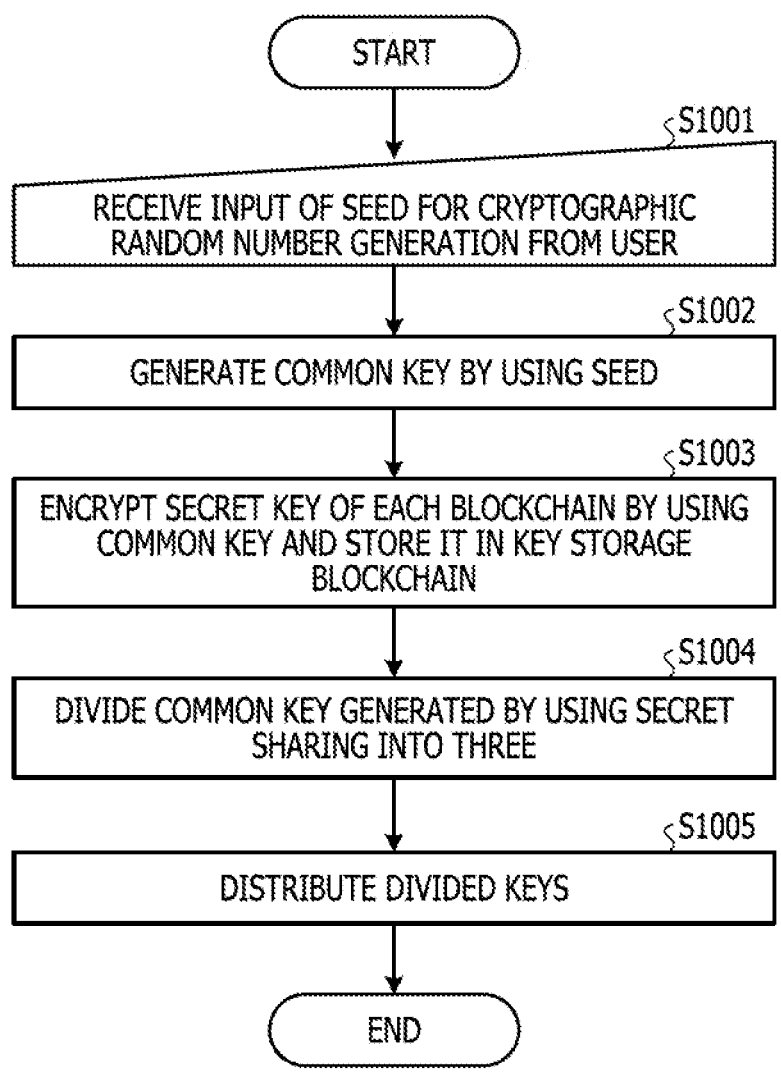
FIG. 7A is a flowchart illustrating an operation example at the time of environment setting.

FIGS. 7A and 7B are flowcharts illustrating an operation example at the time of environment setting. More specifically, FIG. 7A illustrates an operation example at the time of environment setting in the key management system 12. Further, FIG. 7B illustrates an operation example at the time of environment setting in the smart contract management 14.

As illustrated in FIG. 7A, when processing is started in the key management system 12, the common key generation unit 122 receives an input of a SEED for cryptographic random number generation from the user U1 (S1001). Next, the common key generation unit 122 creates a common key by using the SEED (S1002). Specifically, the common key generation unit 122 generates a random number from the input SEED to generate the common key.

Next, the secret key encryption unit 126 encrypts the secret key of the user U1 of each asset blockchain Ca, Cb, ... by using the generated common key, and the secret key writing unit 127 stores the encrypted secret key in the key storage blockchain Ce (S1003).

FIG. 8A is an explanatory diagram exemplifying a data format of a key storage blockchain Ce. As illustrated in FIG. 8A, the divided key generation unit 123 associates identification information (user ID) of the user U1 with identification information (chain ID) of each asset blockchain Ca, Cb, ... as a key, and then stores information (value) of the encrypted secret key in the key storage blockchain Ce.

Referring back to FIG. 7A, after S1003, the divided key generation unit 123 divides into (generates) three divided decryption keys K1, K2, and K3 that may be decrypted when two of the three are aligned, by the generated common key, by using the secret sharing method (S1004).

Figure 8B:
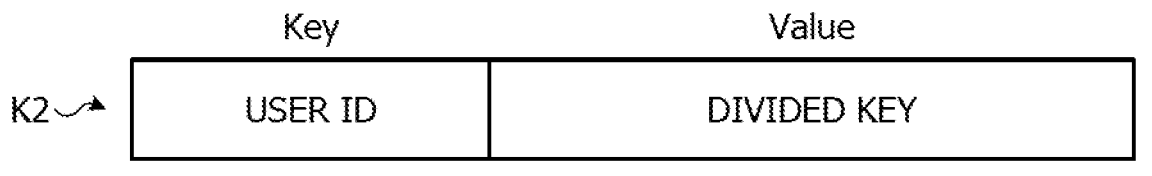

FIG. 8B is an explanatory diagram exemplifying a data format of a divided key. As illustrated in FIG. 8B, for example, in the divided decryption key K2, identification information (user ID) of the user U1 and key information (value) of a key divided by secret sharing from the common key are associated with each other.

Next, the divided key distribution unit 125 distributes the divided (generated) divided decryption keys K1, K2, and K3 (S1005), and ends the processing. Specifically, the divided key distribution unit 125 distributes the divided decryption key K1 to the terminal 13 by using the encrypted communication such as TLS. Further, the divided key distribution unit 125 distributes the divided decryption key K2 to each node (node N1, N2, ... ) via the smart contract management 14. Further, the divided key distribution unit 125 stores the divided decryption key K3 in the divided key storage unit 124.

As illustrated in FIG. 7B, when the processing is started by the smart contract management 14, the environment inspection unit 142 checks the trust zone 303 of a distribution destination system (node N1, N2, ... ) of the asset management smart contract 15 by using the Remote Attestation function (S1006).

Next, based on the check result, the smart contract distribution unit 143 determines whether or not the environment of the trust zone 303 of the distribution destination system is safe (OK) (S1007). In a case where it is OK (S1007: Yes), the smart contract distribution unit 143 distributes the asset management smart contract 15 to the delivery destination system through secure communication such as TLS, and deploys it (S1008). In a case where it is not OK (S1007: No), the smart contract distribution unit 143 does not distribute the asset management smart contract 15 and records in an error log (S1009).

As described above, in the coupling chain 10, the divided decryption keys K1, K2, and K3 divided by secret sharing are placed at different locations, thereby reducing the risk of leakage caused by placing the common key at one location. Accordingly, it is possible to suppress the asset of the asset blockchains Ca, Cb, Cc, and Cf from being illegally transferred, and improve security.

Next, an operation of the coupling chain 10 when the asset of the user U1 is transferred between the asset blockchains Ca, Cb, Cc, and Cf will be described with reference to FIGS. 9 to 12B.

Figure 9:
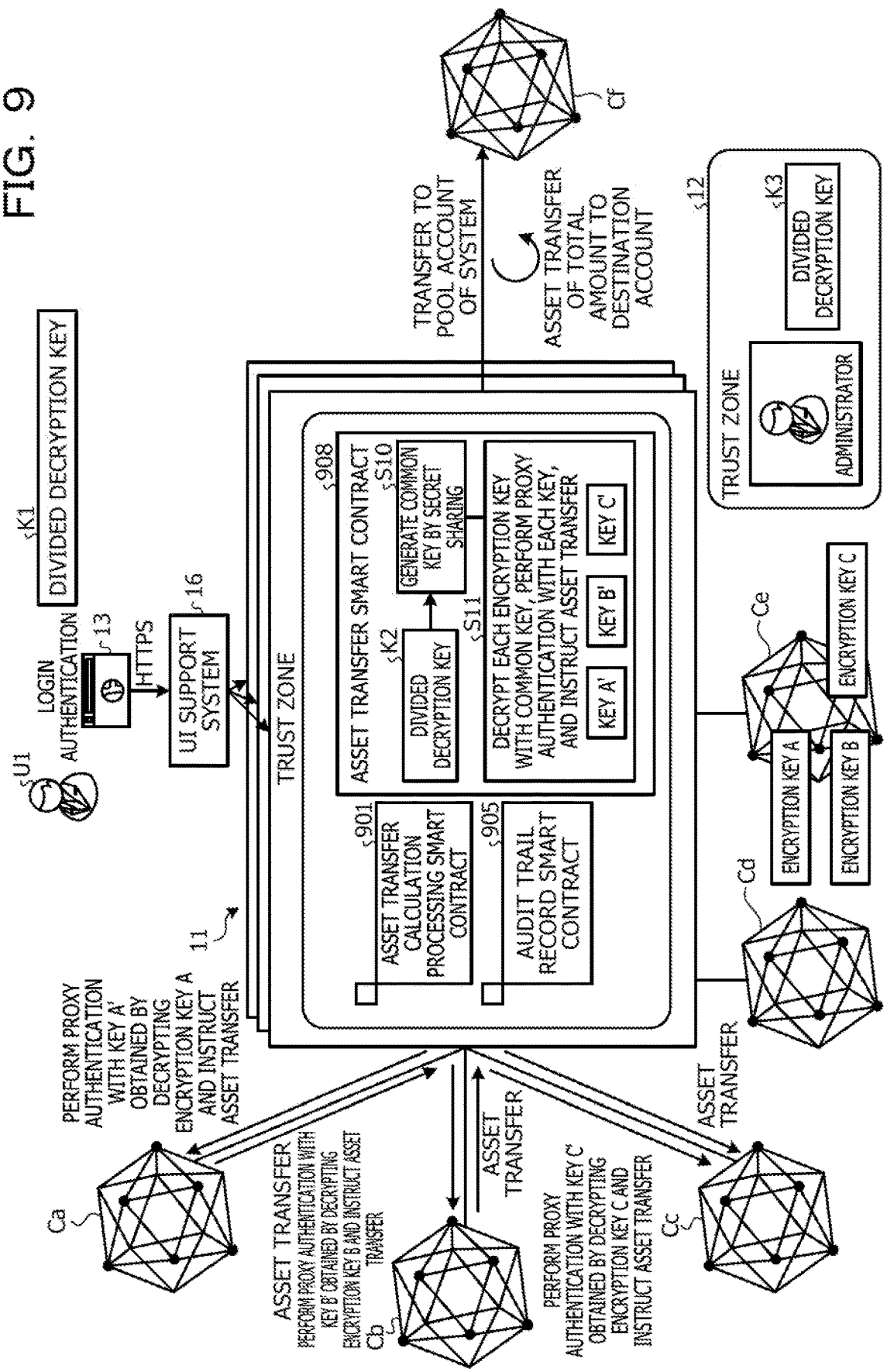
FIG. 9 is an explanatory diagram for explaining an overview during operation.

FIG. 9 is an explanatory diagram for explaining an overview during operation. As illustrated in FIG. 9, first, the user U1 of the coupling chain 10 accesses a UI support system 16 by the terminal 13 through the secure communication (TLS communication) such as HTTPS, and performs login authentication using an ID and a password. Thus, the user U1 logs in to the asset transfer system 11 and performs an operation related to the asset transfer.

Specifically, the user U1 accesses the UI support system 16 from the terminal 13 through the encrypted TLS communication, and designates the asset blockchains Ca, Cb, and Cc as the blockchains of the asset transfer source from, for example, an operation screen of the UI support system 16. Further, the user U1 designates the asset blockchain Cf as the blockchain of the asset transfer destination, and inputs the divided decryption key K1 acquired at the time of the environment setting to instruct the asset transfer.

The asset transfer system 11 includes, in the trust zone 303, an asset transfer calculation processing smart contract 901, an audit trail record smart contract 905, and an asset transfer smart contract 908.

The asset transfer calculation processing smart contract 901 is a smart contract that performs calculation processing related to the asset transfer. The audit trail record smart contract 905 is a smart contract that records an audit trail related to the asset transfer in an audit trail blockchain Cd. The asset transfer smart contract 908 is a smart contract that performs procedure processing related to the asset transfer between a plurality of designated blockchains.

The asset transfer smart contract 908 of the asset transfer system 11 receives the asset transfer instruction from the UI support system 16, and generates a common key in order to decrypt a key for performing a proxy authentication of each blockchain related to the asset transfer (S10). Specifically, the asset transfer smart contract 908 generates the common key by using the divided decryption key K2 stored in a divided key saving unit 909 (refer to FIG. 10) and the divided decryption key K1 input by the user U1, and by using the processing of the secret sharing method described above.

Note that, in a case where the asset transfer smart contract 908 does not obtain the input of the divided decryption key K1 from the UI support system 16 and is instructed to use the divided decryption key K3 managed by the key management system 12 for emergency, the asset transfer smart contract 908 performs predetermined authentication processing on the user U1. In a case where the confirmation of the user U1 is obtained in the authentication processing, the asset transfer smart contract 908 generates a common key by using the divided decryption key K3 managed by the key management system 12 and the divided decryption key K2.

Next, the asset transfer smart contract 908 extracts each encryption key A, B, and C from the key storage blockchain Ce, decrypts keys (A', B', and C') of the asset blockchains Ca, Cb, and Cc by using the generated common key, and develops the keys over the memory (trust zone 303).

Next, the asset transfer smart contract 908 performs the proxy authentication on the asset blockchains Ca, Cb, and Cc by using the decrypted keys (A', B', and C'). Specifically, the asset transfer smart contract 908 performs the proxy authentication on the asset blockchain Ca by using the key A'. Similarly, the asset transfer smart contract 908 performs proxy authentication on the asset blockchain Cb by using the key B', and performs the proxy authentication on the asset blockchain Cc by using the key C.

The asset transfer calculation processing smart contract 901 acquires the balance from the asset blockchains Ca, Cb, and Cc after the authentication, determines an asset transfer amount to be transferred from the asset blockchains Ca, Cb, and Cc to the asset blockchain Cf based on the total of the transfer amounts input by the UI support system 16, and executes the asset transfer.

The audit trail record smart contract 905 collects a series of asset transfer processes (logs), and saves the collected logs in the audit trail blockchain Cd as audit trail information for leaving the logs as the audit trail.

Figure 10:
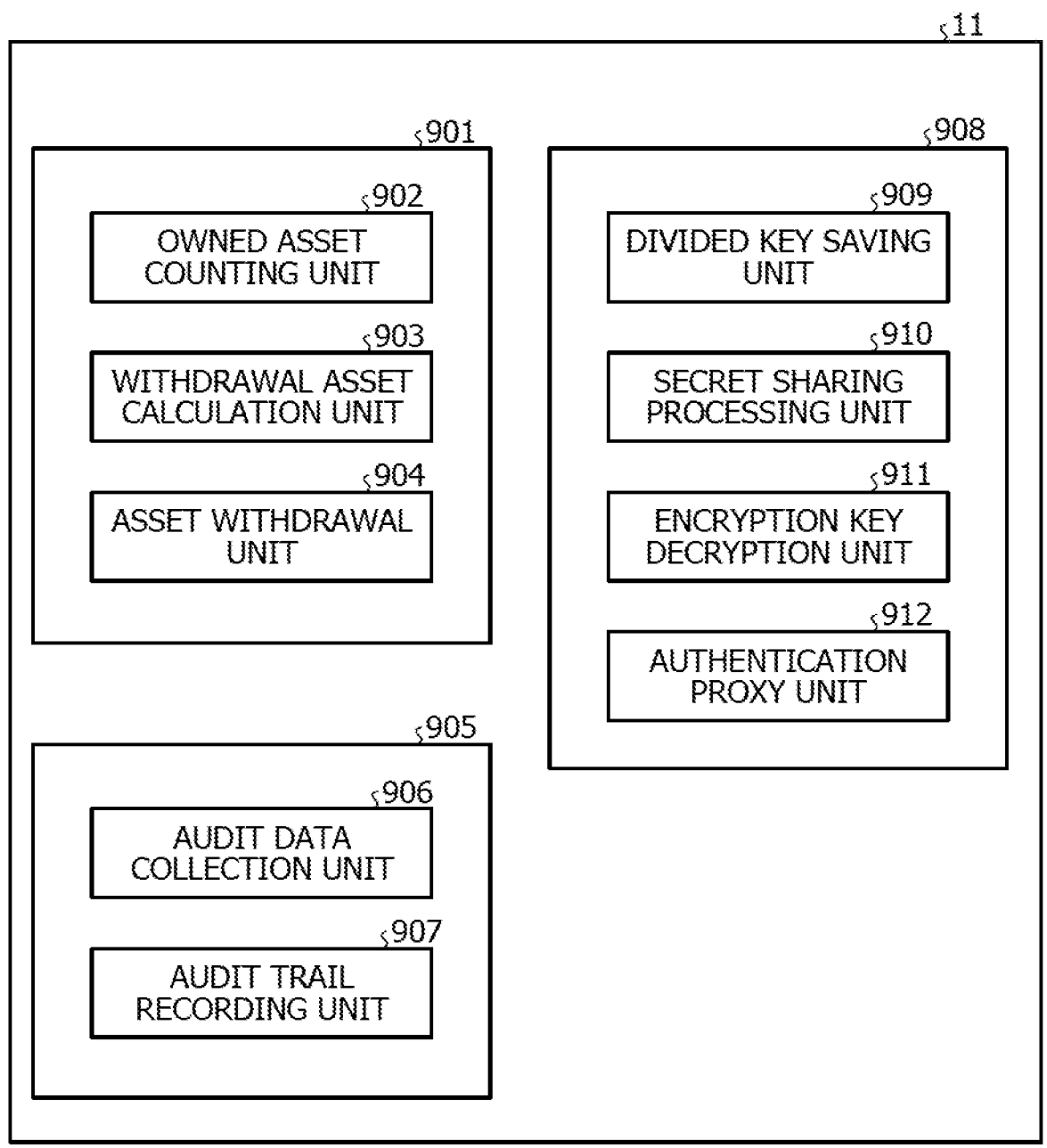
FIG. 10 is a block diagram illustrating a functional configuration example of an asset transfer system.

FIG. 10 is a block diagram illustrating a functional configuration example of the asset transfer system 11. As illustrated in FIG. 10, the asset transfer calculation processing smart contact 901 includes an owned asset counting unit 902, a withdrawal asset calculation unit 903, and an asset withdrawal unit 904.

The owned asset counting unit 902 is a processing unit that reads an owned asset corresponding to the user U1 from each blockchain (for example, the asset blockchains Ca, Cb, and Cc) and counts the owned asset. Accordingly, the asset transfer system 11 may obtain an amount of assets (for example, an owned amount) owned by the user U1 in each blockchain. The withdrawal asset calculation unit 903 is a processing unit that performs calculation processing of calculating a withdrawal asset for each blockchain (for example, the asset blockchains Ca, Cb, and Cc). The asset withdrawal unit 904 is a processing unit that performs withdrawal processing of withdrawing assets from the owned assets corresponding to the user U1 for each blockchain (for example, the asset blockchains Ca, Cb, and Cc).

The audit trail record smart contract 905 includes an audit data collection unit 906 and an audit trail recording unit 907. The audit data collection unit 906 is a processing unit that collects a series of asset transfer processes (logs). The audit trail recording unit 907 is a processing unit that records logs collected by the audit data collection unit 906 as audit trail information in the audit trail blockchain Cd.

The asset transfer smart contract 908 includes a divided key saving unit 909, a secret sharing processing unit 910, an encryption key decryption unit 911, and an authentication proxy unit 912.

The divided key saving unit 909 stores key information of the divided decryption key K1 input by the user U1, the divided decryption key K2 set at the time of the environment setting, and the like. The secret sharing processing unit 910 is a processing unit that generates a common key from the divided decryption keys K1, K2, and K3 by using the processing of the secret sharing method. The encryption key decryption unit 911 is a processing unit that extracts the encryption keys A, B, and C of the user U1 from the key storage blockchain Ce, and decrypts the keys (A', B', and C') of the asset blockchains Ca, Cb, and Cc by using the generated common key. The authentication proxy unit 912 is a processing unit that performs a proxy authentication on the asset blockchains Ca, Cb, and Cc by using the decrypted keys (A', B', and C').

FIG. 11 is a flowchart illustrating an operation example during operation. When the processing is started as illustrated in FIG. 11, the user U1 logs in to the UI support system 16, and inputs asset transfer information (the amount of asset transfer, the blockchain of the asset transfer source, and the blockchain of the asset transfer destination) and the divided decryption key K1 (S1101).

Next, in the asset transfer smart contract 908 over the trust zone 303 of the asset transfer system 11, based on the input divided decryption key K1 and the divided decryption key K2 stored in the divided key saving unit 909, the secret sharing processing unit 910 generates a common key by using the processing of the secret sharing method (S1102).

Next, in the asset transfer smart contract 908, the encryption key decryption unit 911 extracts each encryption key A, B, and C of each blockchain, in which the asset is saved, from the key storage blockchain Ce, and decrypts the encryption key by using the common key. Next, the authentication proxy unit 912 performs the proxy authentication on the asset blockchains Ca, Cb, and Cc by using the decrypted keys (A', B', and e), and instructs the asset transfer (S1103). This proxy authentication enables the asset transfer (withdrawal of asset) from each asset blockchain Ca, Cb, and Cc. Note that, the authentication proxy unit 912 deletes the generated common key and the decrypted keys (A', B', and C') from the trust zone 303 after the processing (S1103) of transmitting the asset to the blockchain by the proxy authentication.

Next, in the asset transfer calculation processing smart contract 901, the owned asset counting unit 902 acquires the balance of each blockchain, and the withdrawal asset calculation unit 903 calculates and determines the asset transfer amount of each blockchain based on the total of the input asset transfer and the balance of each blockchain. Next, based on the determined asset transfer amount of each blockchain, the asset withdrawal unit 904 transfers the asset from the blockchain of the asset transfer source (for example, the asset blockchains Ca, Cb, and Cc) to the blockchain of the asset transfer destination (for example, the asset blockchain Cf) (S1104).

FIG. 12A is an explanatory diagram exemplifying usage frequency information. FIG. 12B is a flowchart illustrating an example of asset transfer processing. As illustrated in FIG. 12B, when the processing is started, the withdrawal asset calculation unit 903 reads the asset transfer amount (S1201).

Next, the withdrawal asset calculation unit 903 calculates a transfer amount from each blockchain (for example, the asset blockchains Ca, Cb, and Cc) of the asset transfer source (S1202). Specifically, the withdrawal asset calculation unit 903 performs the withdrawal of the deposits of the blockchain (owned asset) by weighting according to the usage frequency of the withdrawal, instead of dividing by the number of blockchains. For example, the withdrawal asset calculation unit 903 refers to usage frequency information 920 (refer to FIG. 12A) in which the actual usage frequency of each blockchain is recorded as a log or the like, and calculates the transfer amount of each blockchain by using, for example, the relationship, such as: the withdrawal amount of each blockchain=(transfer amount)×(weight value according to the usage frequency).

Next, the withdrawal asset calculation unit 903 determines whether or not the transfer amount of each blockchain is smaller than the deposit amount (owned asset) (S1203). In a case where the transfer amount exceeds the deposit amount (S1203: No), the withdrawal asset calculation unit 903 transfers the maximum amount of the transfer amount from the blockchain. Next, the withdrawal asset calculation unit 903 recalculates the remaining asset transfer amount as a ratio in a case where the usage frequency of the remaining blockchain is 100% (S1204), and returns the processing to S1202.

That is, in a case where the withdrawal amount (transfer amount) of each blockchain exceeds the deposit amount (owned asset), the withdrawal asset calculation unit 903 tries to withdraw the maximum amount that may be withdrawn. Further, the withdrawal asset calculation unit 903 determines the withdrawal amount again so that the total of the usage frequency of the remaining blockchains is 100%.

Next, the asset withdrawal unit 904 transfers the asset to the blockchain (for example, the asset blockchain Cf) of the asset transfer destination by the transfer amount of each blockchain (for example, the asset blockchains Ca, Cb, and Cc) of the asset transfer source (S1205).

Referring back to FIG. 11, subsequently to S1104, in the audit trail record smart contract 905, an asset transfer status (log) is collected by the audit data collection unit 906, and the collected log is recorded in the audit trail blockchain Cd as the audit trail information (S1105), and the processing ends.

As described above, in the asset transfer smart contract 908 of the asset transfer system 11, when the recording request for the asset information to the asset blockchains Ca, Cb, Cc, and Cf, and the divided decryption key K1 (first key information) are received, the common key (third key information) is generated based on the divided decryption key K1 and the divided decryption key K2 (second key information) stored in the specific storage area (trust zone 303). Further, in the asset transfer smart contract 908, by using the generated common key, the key information associated with the blockchain is decrypted, among the plurality of encrypted key information (encryption keys A, B, and C), and the fourth key information (keys A', B', and C') is generated. Further, in the asset transfer smart contract 908, the generated fourth key information and the recording request for the asset information are transmitted to the blockchain.

Accordingly, the user U1 may perform the asset transfer procedure for a plurality of blockchains after decrypting each key information associated with a plurality of blockchains by performing one procedure (request for recording asset information and transmission of divided decryption key K1) in the asset transfer smart contract 908, for example. In this way, in the asset transfer system 11, it is possible to support the asset transfer between a plurality of blockchains so as to reduce the load of the user U1 related to the asset transfer between the plurality of blockchains.

Further, the trust zone 303 is a storage area protected by the data encryption. Accordingly, for example, it is possible to suppress that data is referred to from a process other than the process related to the smart contract, such as the asset transfer smart contract 908, which is capable of accessing the protected storage area, thereby suppressing the leakage of the divided decryption key K2.

Further, the generated third key information (common key) is stored in the trust zone 303. Accordingly, for example, it is possible to suppress data from being referred to from a process other than the process related to the smart contract such as the asset transfer smart contract 908, thereby suppressing the leakage of the common key.

Further, the generated fourth key information (keys A', B', and C') is stored in the trust zone 303. Accordingly, for example, it is possible to suppress data from being referred to from a process other than the process related to the smart contract such as the asset transfer smart contract 908, thereby suppressing leakage of the fourth key information (keys A', B', and C').

Note that, the storage capacity of the trust zone 303 is limited. Therefore, when there are a large number of blockchains and key information on all the blockchains is held in the trust zone 303, it is strict in terms of storage capacity. For example, when there are 100 blockchains and there are 100 users U1, the number of keys is 10000 (=100×100). On the other hand, it is sufficient to have as many divided decryption keys K2 as the number of users U1. For example, when the number of users U1 is 100, the number of divided decryption keys K2 managed for each user ID is 100.

In the present embodiment, the divided decryption keys K2 for the number of users U1 are stored in the trust zone 303 (refer to FIG. 8). Moreover, when the key information of the blockchain is required, the key information (the third key information and the fourth key information) that is required is generated and stored in the trust zone 303. Therefore, the storage capacity of the trust zone 303 required to hold the key information may be suppressed.

Further, in the asset transfer smart contract 908, after the processing of transmitting to the blockchain, the generated third key information (common key) and fourth key information (keys A', B', and C') are deleted from the trust zone 303. In this way, since the key information that becomes unnecessary after the transmission to the blockchain is deleted from the trust zone 303, it is possible to suppress the storage capacity of the trust zone 303 from being pressed.

Note that, the constituent components of the devices illustrated in the drawings may not be physically configured as illustrated in the drawings. That is, specific forms of the separation and integration of each of the devices are not limited to those illustrated in the drawings. All or some of the devices may be functionally or physically separated and integrated in an arbitrary unit based on various loads, usage statuses, and the like.

Further, regarding various processing functions performed in the asset transfer system 11 and the key management system 12, all or any part of the various processing functions may be executed over a central processing unit (CPU) (or a microcomputer such as a microprocessor unit (MPU) or a microcontroller unit (MCU)). Further, it is to be understood that all or any part of the various processing functions may be executed over programs analyzed and executed by a CPU (or a microcomputer such as an MPU or an MCU) or over hardware using wired logic. Further, the various processing functions performed by the asset transfer system 11 and the key management system 12 may be executed by cloud computing in which a plurality of computers cooperate with each other.

Meanwhile, the various processing described in the above embodiment may be realized by executing a program stored in advance in the auxiliary storage device 203 or the like on a computer (refer to FIG. 2). The program may not be stored in the auxiliary storage device 203. For example, the program stored in a computer-readable recording medium may be read and executed. The computer-readable recording medium corresponds to, for example, a portable recording medium such as a compact disc read-only memory (CD-ROM), a digital versatile disc (DVD), a Universal Serial Bus (USB) memory, a semiconductor memory such as a flash memory, a hard disk drive, or the like. Further, the program may be stored in a device coupled to a public network, the Internet, a LAN, or the like, and the computer may read and execute the program from the device via the interface device 202, and the like.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control method comprising:
generating third key information, when receiving a recording request for asset information to a first blockchain of a plurality of blockchains and first key information from a terminal used by a user, by decrypting by using the first key information and second key information stored in a certain storage area;
generating fourth key information by decrypting first encrypted key information associated with the first blockchain among a plurality of pieces of encrypted key information by using the generated third key information, each of the plurality of pieces of encrypted key information being associated with each of the plurality of blockchains, the plurality of pieces of encrypted key information being generated by encrypting;
performing an authentication on the first blockchain by using the fourth key; and
transmitting the recording request to the first blockchain,
wherein the first key information, the second key information, and a fifth key are generated by sixth key information generated by a random number received from the user, and
the first key information, the second key information, and the fifth key are divided decryption keys that are decrypted when two of the divided decryption keys are aligned.

2. The control method according to claim 1, wherein the certain storage area is a storage area protected by data encryption.

3. The control method according to claim 2, wherein the third key information is stored in the certain storage area.

4. The control method according to claim 3, wherein the fourth key information is stored in the certain storage area.

5. The control method according to claim 4, further comprising:
deleting the third key information and fourth key information from the certain storage area after the transmitting to the blockchain.

6. A non-transitory computer-readable storage medium storing a program that causes a processor included in an information processing apparatus to execute a process, the process comprising:
generating third key information, when receiving a recording request for asset information to a first blockchain of a plurality of blockchains and first key information from a terminal used by a user, by decrypting by using the first key information and second key information stored in a certain storage area;
generating fourth key information by decrypting first encrypted key information associated with the first blockchain among a plurality of pieces of encrypted key information, by using the generated third key information, each of the plurality of pieces of encrypted key information being associated with each of the plurality of blockchains, the plurality of pieces of encrypted key information being generated by encrypting;
performing an authentication on the first blockchain by using the fourth key; and
transmitting the recording request to the first blockchain,
wherein the first key information, the second key information, and a fifth key are generated by sixth key information generated by a random number received from the user, and
the first key information, the second key information, and the fifth key are divided decryption keys that are decrypted when two of the divided decryption keys are aligned.

7. The non-transitory computer-readable storage medium according to claim 6, wherein the certain storage area is a storage area protected by data encryption.

8. The non-transitory computer-readable storage medium according to claim 7, wherein the third key information is stored in the certain storage area.

9. The non-transitory computer-readable storage medium according to claim 8, wherein the fourth key information is stored in the certain storage area.

10. An information processing apparatus comprising:
a memory; and
a processor coupled to memory and configured to:
generate third key information, when receiving a recording request for asset information to a first blockchain of a plurality of blockchains and first key information from a terminal used by a user, by decrypting by using the first key information and second key information stored in a certain storage area,
generate fourth key information by decrypting first encrypted key information associated with the first blockchain among a plurality of pieces of encrypted key information; by using the generated third key information, each of the plurality of pieces of encrypted key information being associated with each of the plurality of blockchains, the plurality of pieces of encrypted key information being generated by encrypting,
perform an authentication on the first blockchain by using the fourth key, and
transmit the recording request to the first blockchain,
wherein the first key information, the second key information, and a fifth key are generated by sixth key information generated by a random number received from the user, and
the first key information, the second key information, and the fifth key are divided decryption keys that are decrypted when two of the divided decryption keys are aligned.

11. The information processing apparatus according to claim 10, wherein the certain storage area is a storage area protected by data encryption.

12. The information processing apparatus according to claim 11, wherein the third key information is stored in the certain storage area.

13. The information processing apparatus according to claim 12, wherein the fourth key information is stored in the certain storage area.

14. The information processing apparatus according to claim 13, wherein the processor deletes the third key information and fourth key information from the certain storage area after the transmitting to the blockchain.

\* \* \* \* \*